Dec. 23, 1958 E. GENNING ET AL 2,866,009

SOUND RECORDING AND SOUND REPRODUCING APPARATUS

Filed Dec. 28, 1951 3 Sheets-Sheet 1

INVENTORS
Ernst Genning
Willi Draheim
Nikolaus Monske,

BY [signature]
ATTORNEY

Dec. 23, 1958 E. GENNING ET AL 2,866,009

SOUND RECORDING AND SOUND REPRODUCING APPARATUS

Filed Dec. 28, 1951 3 Sheets-Sheet 2

INVENTORS
Ernst Genning
Willi Draheim
Nikolaus Monske,

BY [signature]

ATTORNEY

INVENTORS
Ernst Genning
Willi Draheim
Nikolaus Monske,
BY [signature]
ATTORNEY

United States Patent Office 2,866,009

Patented Dec. 23, 1958

2,866,009

SOUND RECORDING AND SOUND REPRODUCING APPARATUS

Ernst Genning and Willi Draheim, Fassberg, and Nikolaus Monske, Hannover, Germany; said Genning and Draheim assignors to Protona, Hannover, Germany Application December 28, 1951, Serial No. 263,812

Claims priority, application Germany October 27, 1951

8 Claims. (Cl. 179—100.2)

This invention relates to sound recording and sound reproducing apparatus and more particularly to such apparatus utilizing a wire carrier and especially to such apparatus encompassed within a small enclosure of pocket size.

A primary object of this invention is to provide a compact, light weight, pocket sized, self-contained and portable sound recording and reproducing apparatus.

Another object of this invention is to provide a sound reproducing and recording apparatus in conformity with the preceding object wherein a plurality of brake means are constructed to operate in coordination with certain control means for the apparatus whereby the device is at once rendered simple in construction and efficient in operation.

Still another object of this invention resides in the provision of control means movable between a winding and rewinding position and having associated therewith plural brake means for applying the proper tension between the winding and unwinding reels as direction of drive may dictate.

A further object of this invention resides in an apparatus in accordance with the preceding objects wherein a further brake means is provided in conjunction with the control for said drive means to stop the motion of the receiving or takeup reel in an intermediate position of such control between either of its drive positions.

A still further object of this invention is to provide an apparatus in conformity with the preceding object and including an additional brake means for the takeup reel and associated with a switch control for turning the drive motor off and on.

Still another object of this invention is to provide an improved sound recording and reproducing apparatus including a supply reel and a takeup reel and an intermediate transducing head wherein the head is carried in such a manner as to automatically operate to feed the sound wire back and forth across the face of the supply reel when the drive is in the rewind position.

Yet another object of the invention is to provide a sound recording and reproducing apparatus having simplicity of design, economy of construction and efficiency in operation.

The novel features that are considered characteristic of the invention are set forth with particularity in the appended claims. The invention itself, however, both as to its organization and its method of operation, together with additional objects and advantages thereof, will best be understood from the following description of a specific embodiment when read in connection with the accompanying drawings wherein like reference characters indicate like parts through the several figures and in which:

Figure 1:
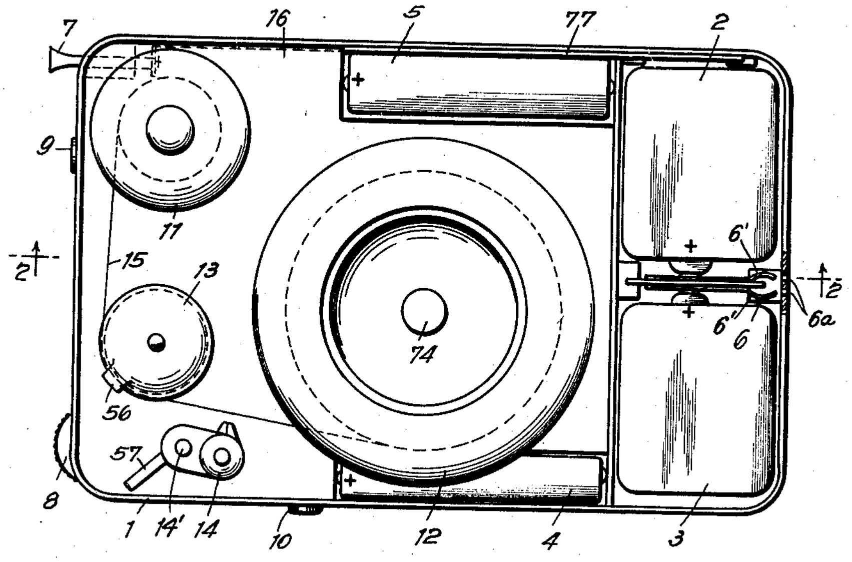
Fig. 1 is a top plan view of the apparatus with the cover removed.
Figure 2:
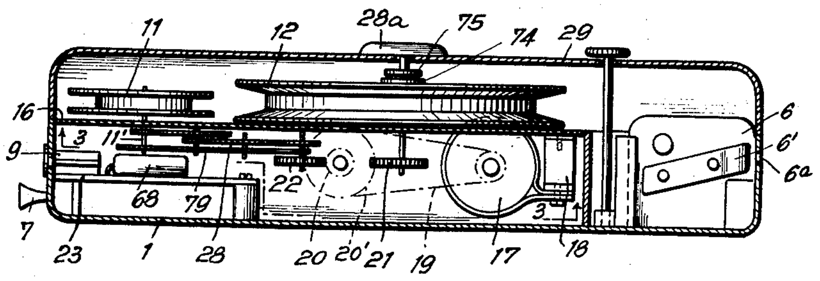
Fig. 2 is a cross-sectional view taken through the apparatus on the plane of line 2—2 of Fig. 1.

Referring more particularly to the drawings, specifically to Figs. 1 and 2, the apparatus will be seen to comprise a casing 1 partially enclosed by a plate 16 and completely enclosed by a removable cover 29, both the casing 1 and cover 29 preferably being molded or otherwise formed from non-conductive material such as thermoplastic. Within the casing 1 and beyond the plate 16, to enable ready accessibility and replacement, are housed motor energizing batteries 2 and 3, as well as batteries 4 and 5 for energizing a reproducing and recording circuit. A switch 6 is disposed between the motor batteries 2 and 3 for placing said batteries in parallel connection and this switch also includes contacts 6' for engagement with the prongs of a plug connected with a main current supply, the casing 1 having apertures **6*a* adjacent the switch 6 for the insertion of the plug prongs into the casing. The casing 1 and cover 29 are of a size jointly fitting in a pocket or other carrier and by means of the switch 6**, the apparatus may be battery powered when in portable use or it can be powered from the supply mains when not in portable use.

Mounted in the casing 1, for external access, are a series of controls and switching circuit portions including a motor control switch plunger 7 adapted to turn the device on and off, a volume control 8, a microphone-earphone jack 9, and a forward and reverse switch button 10. Rotatably supported on the plate 16 are small and large reel members 11 and 12, respectively, the reel 11 being the supply reel and upon which a wire recording member 15 is originally wound to be fed therefrom for winding on the larger takeup reel 12. The wire 15 extends from the supply reel 11 to the takeup reel 12 and intermediately thereof passes over a recording and reproducing head 13. Removably supported beneath the plate 16 and within the casing 1, by hangers 18, is a motor 17 which is connected to the reels 11 and 12 by a drive mechanism, hereinafter described, and electrically connected to the batteries 2 and 3 by a switch rod 77 that is actuated by the plunger 7.

Situated between the transducing head 13 and the takeup reel 12, is an erasing head 14 swingably supported by a shaft member 14' and having a lateral extension 57 thereon. The erasing head 14 is provided with permanent magnet members movable into and out of closely spaced relation to the wire 15, as will be readily appreciated. When in the erasing position, the lateral extension or lever 57 will be projected outwardly from within the confines of the casing 1 and will prevent the engagement of the cover portion 29 thereon. Consequently, the extension 57 constitutes a safety device preventing the erasing head 14 from accidently remaining in the erasing position when the cover is closed and the device is to be used for recording or reproducing.

Figure 3:
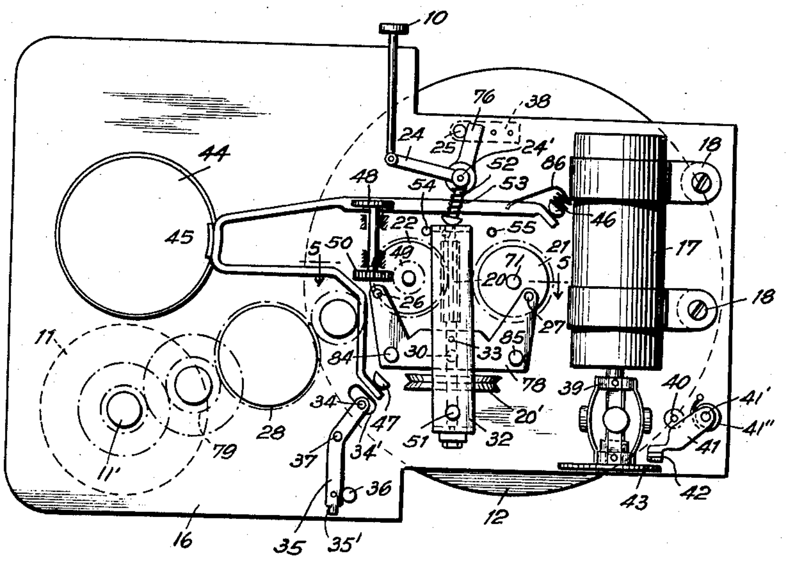
Fig. 3 is a bottom plan of the apparatus with the casing removed therefrom as seen from the viewing line 3—3 of Fig. 2.

Associated with the drive shaft of the motor 17, is a fly-weight governor assembly 39, as shown in Fig. 3, which includes a brake disc or plate 43 that is adapted to be shifted longitudinally or axially along the drive shaft of the motor under the influence of the fly-weights in response to the particular speed at which the shaft is driven. The brake plate 43 cooperates with a braking element 42 rigidly mounted on an arm member 41 that is swingably supported by a pivot shaft member 41'. Preferably, a coil spring member 41'' is associated with the arm 41 to normally bias the arm to swing the brake element 42 away from the brake disc 43. An adjustable element 40, threadedly engaged through the plate 16, has a conical end portion projecting into the path of the arm 41 remote from the braking disc 43, and may be turned in or out to selectively limit movement of the brake element 42 relative to the "at rest" position of the brake disc 43. It will be readily appreciated that the precise positioning of the arm 41 and its brake element 42, as occasioned by the adjustment of the member 40, will control the speed of the motor 17.

Turning now to the drive means between the motor 17 and the reels 11 and 12, a winding gear element or worm wheel 21 is connected with the takeup reel 12 and a rewind gear element 22 is connected with the supply reel 11, as will be hereinafter described. An elongate, generally U-shaped carrier element 32 is pivotally mounted adjacent one end in the casing 1 on a stub shaft 51, as shown in Fig. 3, the shaft 51 being located on a line midway between the worm wheels 21 and 22. Journaled between the upstanding, parallel arms of the carrier 32, is a worm assembly 20, and rigid with this worm assembly is a pulley element 20' driven by a belt member 19 (Fig. 2) trained over a suitable pulley, not shown, on the shaft of the motor 17. Consequently, at any time the motor is operating, the worm assembly 20 will be rotated. Due to the pivotal connection of the carrier 32, the worm 20 is selectively swingable back and forth from positions drivingly engaging either the winding gear element 21 or the rewind gear element 22 for forward or reverse drive of the recording wire 15.

The control button 10, for control of forward and reverse winding of the wire 15, is of the push-pull variety and is pivotally connected at its inner end to a bell crank assembly including the arm 24 and the shaft member 52 which are rigidly interconnected and pivoted about an intermediate point 24'. The shaft 52 projects into or through an opening in the vertical leg of the carrier member 32 remote from the pivoted end thereof. A compression spring element 53 surrounds the shaft 52 between the pivot 24' and carrier 32 and provides an over center lock for maintaining the carrier 32 together with drive worm 20 in either its forward or reverse winding position. To determine the limits of travel of the carrier 32, stops 54 and 55 are provided on the under surface of the plate 16.

Figure 4:
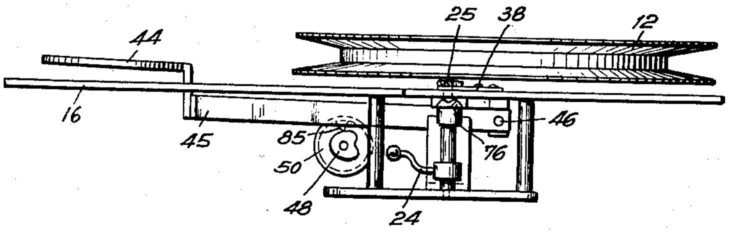
Fig. 4 is a side view in elevation of the apparatus shown in Fig. 3 and showing a portion of the drive means.

Rigidly secured to the arm 24 and shaft 52 is an extension 76 which will, in its intermediate position between the limits of travel of the carrier 32, pass under a brake disc element 25 which projects completely through the plate 16 and is adapted at its upper end to engage against the under surface of the takeup reel 12 in the manner shown most clearly in Fig. 4. Normally, the brake disc 25 is urged downwardly out of engagement with the takeup reel 12 by the spring clip member 38 to one end of which it is attached. Member 38 is cantilevered to the plate 16. In the intermediate position of the carrier 32, that is, in its position wherein drive is transmitted neither to the gear element 21 nor the gear element 22, the beveled head of extension 76 will press the brake disc 25 upwardly to engage and stop the takeup reel 12. However, in either limit of travel of the carrier 32, the extension 76 will clear the cammed brake disc 25 and will permit the takeup reel 12 to freely rotate.

Figure 5:
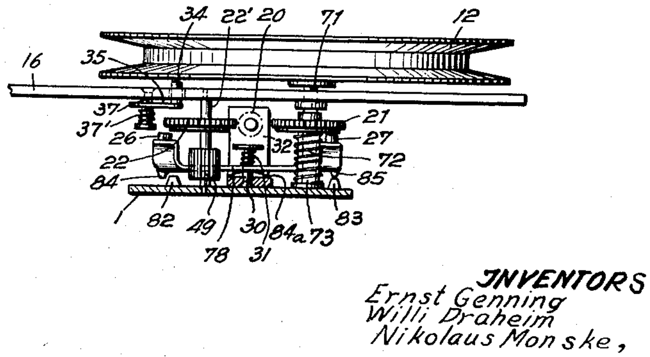
Fig. 5 is a cross-sectional view taken on the plane of line 5—5 of Fig. 3 and further illustrating details of the drive mechanism.

The takeup reel 12 is fixed to and rotates with shaft 71 journaled in plate 16 and casing 1, see Fig. 5. Winding gear 21 is journaled upon shaft 71 and located on a shoulder formed by an enlarged shaft portion 73 which serves to vertically locate the gear 21 and provide a thrust collar therefor. Gear 21 is connected to the shaft 71 through the intermediary of a coil spring element 72 which is anchored at opposite ends to the shaft 71 and the gear element 21. The coil spring element 72 provides a shock absorbing drive connection between the gear element 21 and takeup reel 12, and is needed because of the substantially large mass and consequently relatively large moment of inertia of the takeup reel 12. Preferably, the coil spring element 72 is of such torsional stiffness as to correspond substantially to the driving force required for normal operation of the takeup reel 12.

Journaled between the plate 16 and the bottom of the casing 1 is a vertical shaft 22', best shown in Fig. 5, upon which is rigidly mounted the gear element 22. Extending between the gear element 22 and the shaft 11', as shown in Fig. 3, upon which the supply reel 11 is mounted, is a step-up gear train, including gears 79 and 28 among others not referenced, such that the rewind speed of wire 15 on supply reel 11 is considerably faster than the winding speed of wire 15 on takeup reel 12.

The motor control switch plunger 7 and switch rod 77 are connected to a bell crank member 35 by fitting one end 35' of member 35 into an opening or connecting part, not shown, of the plunger 7 or rod 77. The bell crank 35 is loosely pivoted intermediate its ends on a shaft 37, see Fig. 3, so that it is capable of both a pivotal and a seesaw or tilting action. As is shown most clearly in Fig. 5, the bell crank 35 is continually urged upwardly toward the plate 16 by a spring 37' coiled about the shaft 37. A cam element 36 is projected downwardly from the plate 16 into the path of the end of the bell crank 35. As the switch plunger 7 is manipulated to turn the motor 17 off, the end 35' of the bell crank 35 is forced to pass under the camming element 36 and is cammed thereby away from the plate 16. As the spring 37' continuously urges the bell crank 35 toward the plate 16, this camming action on the end 35' causes the bell crank 35 to tilt on the shaft 37 so that the opposite end thereof is moved upwardly toward the plate 16.

The opposite end of the bell crank 35 carries a brake disc member 34 that extends upwardly through a slot 34' in the plate 16, as shown in Figs. 3 and 5. When the disc member 34 is moved upwardly and swung outwardly by virtue of the pivotal motion of the bell crank 35, the brake disc is caused to engage against the under surface of the takeup reel 12 and stop the same in whatever position it occupies at that time. The switch (not shown) associated with the switch plunger 7 is of the push-pull variety so that when the plunger 7 is pushed inwardly, the brake disc 34 is engaged against the takeup reel 12 as the motor 17 is turned off. When the switch plunger 7 is pulled outwardly to turn the motor 17 on, the end 35' of the bell crank 35 will clear the cam element 36 and permit the brake disc 34 to be swung out of engagement with the takeup reel 12, as a result of the action of spring 37'.

Additional brake elements in the form of discs 27 and 26, respectively, are associated with the gear elements 21 and 22. The brake discs 26 and 27 are carried by a U-shaped brake plate 78 which is mounted transversely upon the carrier 32 to extend on opposite sides thereof as shown in Figs. 3 and 5. The brake plate 78 is swingably mounted upon the carrier 32. Shaft 30 projects through an enlarged opening intermediate the ends of the plate 78. A compression spring 31, Fig. 5, surrounds the shaft 30 to normally force the plate 78 downwardly against a convex washer or seat member 84a mounted between plate 78 and the carrier 32. The convexity of the member 84a permits a seesawing action of the brake plate 78 so that one or the other of the brake elements 26 or 27 will engage the gear elements 22 or 21. A guidance pin 33 or carrier 32 enters an opening in plate 78 and prevents sideward movement of the strap but permits tilting movement. The plate 78 is provided on its underside with downwardly projecting ear portions 84 and 85 on opposite ends thereof which cooperate with upstanding cam elements 82 and 83 mounted on the bottom of the casing 1.

The cam elements 82 and 83 are located so as to engage one or another of ears 84 and 85, when the worm carrier 32 moves to engage the worm 20 against gear 21 or 22, and cause the brake plate 78 to tilt upwardly and strike one of the brakes 27 or 26 against its corresponding gear 21 or 22, the gear braked being the one which is not engaged by the worm 20. The described brake construction provides a proper tension in the wire 15 in either direction of its drive. For example, in the position of parts shown in Figs. 3 and 5, the wire 15 is being rewound upon the supply reel 11, and to properly tension the wire during rewind, the brake disc or button 27 engages the gear 21, providing a braking force on the shaft 71 and the takeup reel 12.

The transducing head 13 is mounted for vertical oscillating motion to feed the wire 15 back and forth across the face of the supply drum 11 during rewinding of wire 15, but not during winding upon the takeup reel 12. To accomplish this function, the transducing head 13 is seated upon and carried by a disc-like member 44 (Fig. 4) above plate 16. Member 44 is provided with a downturned leg which extends through plate 16 and is rigidly secured to a yoke element 45 pivoted about its opposite ends on a common horizontal axis defined by the spaced pivot elements 46 and 47 secured below plate 16. A spring element 86, Fig. 3, urges pivot 46 into engagement with one side of the yoke 45.

A secondary worm 49, Fig. 5, is rigidly secured to shaft 22′ to turn with the gear element 22. Worm 49 engages a worm wheel 50, Fig. 3, rotatably mounted on the under surface of the plate 16 and having rigid therewith a heart-shaped cam element 48, Fig. 4. The yoke 45, intermediate its ends, carries a cam follower element 85′ projecting downwardly therefrom engaging against the surface of the cam 48. Consequently, during the rewinding operation, when gear 22 drives reel 11, the cam element 48 is rotated, through the intermediary of the secondary worm 49 and the worm wheel 50 to cause the yoke 45, member 44 and the transducing head 13 to oscillate vertically, feeding the wire 15 back and forth across the face of the supply drum 11 as the wire 15 is rewound thereon. Preferably, the transducing head 13 carries a bridge element 56 through which the wire 15 is fed to prevent the wire from disengaging the transducing head particularly during the vertical oscillating motion described.

Figure 6:
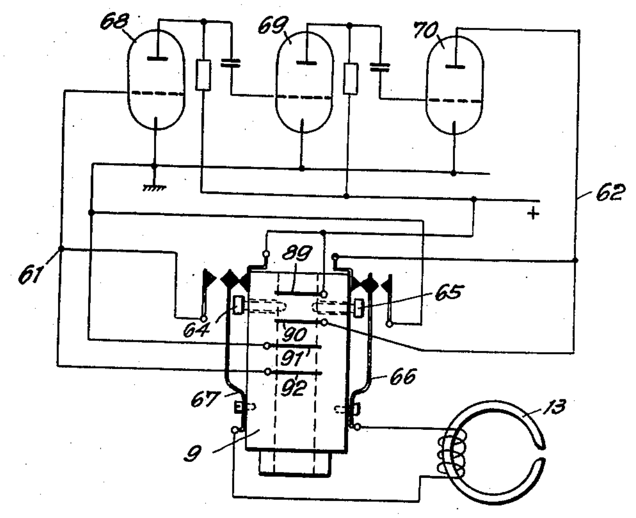
Fig. 6 is a circuit diagram of the reproducing and recording circuits.

Housed within the casing 1, remote from the batteries 2 and 3, are the electrical components for the recording and reproducing circuits. The amplifying unit is indicated by the reference character 23, one of the amplifying tubes 68 being visible in Fig. 2. Three subminiature amplifying tubes 68, 69 and 70 are used, preferably connected in successive amplifying stages as indicated in the circuit diagram shown in Fig. 6. Power from cathode battery 4 and anode battery 5 is supplied to the amplifying circuit by the same switch which controls the motor circuit and is turned on or off by the switch plunger 7 through the medium of the switch rod 77 (Fig. 1). The amplifier input is indicated by the reference character 61, whereas the output of the amplifier is indicated by the reference character 62.

Figure 7:
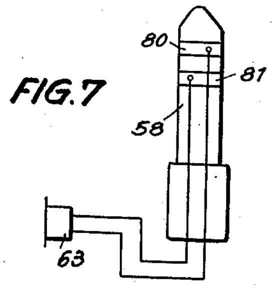
Figs. 7 and 8 show plug jack elements to be utilized respectively in conjunction with the reproducing and recording apparatus.
Figure 8:
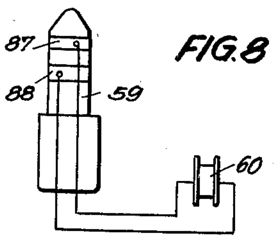

To conserve space and to reduce the circuitry for the recording and reproducing apparatus, the jack 9 serves both as a jack for the microphone and for the ear set or loud-speaker for respectively recording and reproducing the sound. Either jack plug 58 or 59, shown in Figs. 7 and 8, may be utilized in the jack 9, the longer plug 58 being connected to an earphone assembly 63, whereas the shorter plug 59 is inserted into jack 9, the two contact rings 87 and 88 thereon respectively connect to contact members 91 and 92, and bridge microphone 60 across the input of the amplifier unit, thus preparing the circuitry for recordation. The coil of the reproducing head 13 is connected across the amplifying output through switch contacts 66 and 67. When the longer plug 58 is inserted in the jack 9, the rings 80 and 81 thereon respectively connect to the contacts 89 and 90 and bridge the earphone 63 across the amplifier output. Two plunger members 64 and 65 in jack 9 will simultaneously be cammed outwardly to engage the contacts 66 and 67 and switch the coil of the reproducing head 13 across the amplifier input in the manner evident in Fig. 6. Thus, a very compact and neat arrangement for switching from recording to reproducing is obtained and one which is also foolproof inasmuch as the plugs associated with the earphone or microphone operate to preset the circuitry in the desired manner, thereby obviating any faulty electrical connections which might be made if external, manually controlled switches were relied upon.

As an additional feature, the cover 29 of the apparatus incorporates a counter 28*a* calibrated in hours and minutes to apprise the operator of the recording time remaining on wire 15. The counter 28*a* may also be used to mark the start and finish of any particular bit of the recording sequence so that it may be reproduced at will. The counter 28*a* may be of any suitable type having a drive shaft provided with a coupling disc 75 and cooperable with a magnetic coupling disc 74 screwed upon the upper end of the shaft 71 upon which the takeup reel 12 is mounted, such magnetic coupling disc also serving as a nut to hold the takeup reel in position.

To utilize the miniature device described for recording, the operator inserts plug 59 in jack 9 and pulls the switch control 7. This action releases brake 34 and starts the motor 17. The reel 12 is, however, still braked by element 25 until the operator moves control 10 to engage the worm 20 with the driven gear 21. As this occurs, the takeup reel 12 begins to revolve while brake 26 engages gear 22 to cause a drag on the supply reel 11. Sounds picked up by microphone 60 are recorded on wire 15 through the medium of the amplifier unit 23 and the transducer 13. When the operator desires to stop recording, he pushes the switch control 7 which immediately brakes reel 12 through the medium of disc 34 and disconnects the batteries from the motor and amplifier. At any time during recording, the operator may move control 10 to a neutral position disengaging drive worm 20 from both gears 21 and 22. This action will engage brake 25 against reel 12 to stop the reel. To rewind wire 15 on supply reel 11, the operator moves control 10 to engage drive worm 20 with gear 22. During rewind, brake 27 engages gear 21 to cause reel 12 to drag as previously explained.

When the operator desires to reproduce the recorded matter, it will be apparent that he need only remove plug 59 and insert plug 58 into jack 9. Sounds recorded on wire 15 will be reproduced in the head set or loud-speaker 16 through the medium of transducer coil 13 and the amplifying unit. The stopping, starting and braking actions described for recording are performed in the same manner and by the same controls during reproduction.

If desired, the described recorder may be directly connected to the loud-speaker terminals of a radio receiver by removing microphone 60 and adding an attenuation element in the lead wires to plug 59. Alternatively, a coil may be substituted for microphone 60 and attached to the earpiece of a telephone headset to record telephone conversations.

Although a certain specific embodiment of the invention has been shown and described, it is obvious that many modifications thereof are possible. The invention, therefore, is not to be restricted except insofar as is necessitated by the prior art and by the spirit of the appended claims.

What I claim is:

1. In a magnetic sound recording and reproducing apparatus, a supply reel and a take-up reel, each having a driven gear associated therewith, means for selectively driving the driven gears, said means including a movable drive gear carrier between said driven gears, a drive gear supported by said carrier and selectively engageable with the driven gears and a brake element on each side of said carrier and respectively selectively engaging that driven gear not engaged by the drive gear.

2. In a magnetic sound recording and reproducing apparatus, a supply reel and a take-up reel, each having a driven gear associated therewith, means for selectively driving the driven gears, said means including a movable drive gear selectively engageable with the driven gears and brake mechanism carried with the drive gear for selectively engaging that driven gear not engaged by the drive gear, control means for moving said drive gear and movable between first and second positions respectively engaging the drive gear with one and then the other of the driven gears, and brake means engageable with said take-up reel, said brake means being actuated by said control means only when the latter is in an intermediate position wherein the drive gear is out of engagement with both driven gears.

3. In a magnetic sound recording and reproducing apparatus, a supply reel and a take-up reel, each having a driven gear associated therewith, means for selectively driving the driven gears, said means including a movable drive gear selectively engageable with the driven gears and brake mechanism carried with the drive gear for selectively engaging that driven gear not engaged by the drive gear, said drive gear being journaled on an elongate carrier pivoted about one end thereof, said brake mechanism including an elongate strap disposed transversely of said carrier and mounted for rocking movement about its midpoint thereon, a brake disc carried at each end of said strap, and cam means engageable with opposite end portions of the strap as said carrier is moved to engage the drive gear with one or the other of the driven gears, said cam means being positioned to rock the strap to engage one of the brake discs with that driven gear not engaged by said drive gear.

4. In a magnetic sound recording and reproducing device, a supply reel and a take-up reel, an electric motor, switch means for energizing said motor and including a brake for engaging the take-up reel when such switch means is in the off position, first and second driven means connected to the supply reel and the take-up reel respectively for driving the same in opposite directions, common drive means connected to said motor and movable between a position engaging the first driven means and a position engaging the second driven means and having an intermediate position out of engagement with both driven means, control means for moving said drive means between its two drive positions, and brake means actuated by said control means, when the latter is in a position corresponding to the intermediate position of the drive means, to engage and prevent rotation of said take-up reel.

5. In a magnetic sound recording and reproducing device, a supply reel and a take-up reel, an electric motor, switch means for energizing said motor and including a brake for engaging the take-up reel when such switch means is in the off position, first and second driven means connected to the supply reel and the take-up reel respectively for driving the same in opposite directions, common drive means connected to said motor and movable between a position engaging the first driven means and a position engaging the second driven means and having an intermediate position out of engagement with both driven means, control means for moving said drive means between its two drive positions, brake mechanism carried by and movable with said common drive means, cam means positioned in the path of movement of said brake mechanism for actuating the same to impart a braking action on that driven means not engaged by the drive means, and brake means actuated by said control means, when the latter is in a position corresponding to the intermediate position of the drive means, to engage and prevent rotation of said take-up reel.

6. In a magnetic sound recording and reproducing apparatus, a supply reel, a take-up reel, magnetic wire wound between said reels, a transducing head disposed between said reels and over which said wire is trained, an electric motor, first and second driven means connected to said supply reel and said take-up reel respectively for rotating the same in opposite directions, common drive means connected to said motor and movable between a position engaging the first driven means and a position engaging the second driven means, control means for moving said drive means between its two drive positions, and means connected with said first driven means for oscillating said transducing head to feed the wire back and forth across the face of the supply reel when the latter is driven to wind the wire thereon.

7. In a magnetic sound recording and reproducing apparatus, a supply reel, a take-up reel, magnetic wire wound between said reels, a transducing head disposed between said reels and over which said wire is trained, an electric motor, switch means for energizing said motor and including a brake for engaging the take-up reel when such switch means is in the off position, first and second driven means connected to said supply reel and said take-up reel respectively for rotating the same in opposite directions, common drive means connected to said motor and movable between a position engaging the first driven means and a position engaging the second driven means, and having an intermediate position out of engagement with both driven means, control means for moving said drive means between its two drive positions, brake means actuated by said control means, when the latter is in a position corresponding to the intermediate position of the drive means, to engage and prevent rotation of said take-up reel, and means connected with said first driven means for oscillating said transducing head to feed the wire back and forth across the face of the supply reel when the latter is driven to wind the wire thereon.

8. In a magnetic sound recording and reproducing apparatus, a supply reel, a take-up reel, magnetic wire wound between said reels, a transducing head disposed between said reels and over which said wire is trained, an electric motor, switch means for energizing said motor and including a brake for engaging the take-up reel when such switch means is in the off position, first and second driven means connected to said supply reel and said take-up reel respectively for rotating the same in opposite directions, common drive means connected to said motor and movable between a position engaging the first driven means and a position engaging the second driven means, and having an intermediate position out of engagement with both driven means, control means for moving said drive means between its two drive positions, brake means actuated by said control means, when the latter is in a position corresponding to the intermediate position of the drive means, to engage and prevent rotation of said take-up reel, brake mechanism carried by and movable with said drive means, cam means positioned in the path of movement of said brake mechanism for actuating the same to impart a braking action on that driven means not engaged by the drive means, and means connected with said first driven means for oscillating said transducing head to feed the wire back and forth across the face of the supply reel when the latter is driven to wind the wire thereon.

(References on following page)

References Cited in the file of this patent

UNITED STATES PATENTS

| | | |
|---|---|---|
| 597,782 | Ritter | Jan. 25, 1898 |
| 1,237,496 | Frankhauser | Aug. 21, 1917 |
| 2,369,017 | Camras | Feb. 6, 1945 |
| 2,467,507 | Stone | Apr. 19, 1949 |
| 2,481,004 | Dale | Sept. 6, 1949 |
| 2,515,190 | Camras | July 18, 1950 |
| 2,609,457 | Thurm | Sept. 2, 1952 |
| 2,616,982 | Gray | Nov. 4, 1952 |

FOREIGN PATENTS

| | | |
|---|---|---|
| 567,152 | Great Britain | Jan. 31, 1945 |